Patented Oct. 24, 1950

2,527,495

UNITED STATES PATENT OFFICE 2,527,495

POLYVINYL ACETAL RESIN

Andrew F. Fitzhugh, Agawam, Mass., assignor to Shawinigan Resins Corporation, Springfield, Mass., a corporation of Massachusetts No Drawing. Application December 31, 1947, Serial No. 795,133

3 Claims. (Cl. 260—73)

This invention relates to polyvinyl acetals made with crotonaldehyde. More particularly, this invention relates to soluble polyvinyl acetals made with crotonaldehyde and to a process for preparing the same.

Various procedures have been suggested in the art for producing polyvinyl acetals by reacting saturated aldehydes with polyvinyl alcohols in the presence of sulfuric acid. While it occasionally has been suggested that certain unsaturated aldehydes may be reacted in the same manner, attempts to substitute crotonaldehyde in the processes disclosed in the art for making polyvinyl acetals from saturated aldehydes in the presence of sulfuric acid have resulted in products which are insoluble in the usual solvents.

It is an object of this invention to provide soluble polyvinyl acetals made with crotonaldehyde. It is a further object of this invention to provide a process for reacting polyvinyl alcohols with crotonaldehyde in the presence of sulfuric acid to obtain soluble polyvinyl acetals.

These and other objects are attained according to this invention by reacting a polyvinyl alcohol with crotonaldehyde in the presence of sulfuric acid, using methyl alcohol as the reaction medium, and maintaining a large excess of aldehyde in the reaction medium over that required for complete reaction with the polyvinyl alcohol.

The following examples are illustrative of the present invention, but are not to be considered as limitative of the scope thereof. Where parts are mentioned, they are parts by weight.

The polyvinyl alcohols used in these examples are made by hydrolyzing a polyvinyl acetate of such a degree of polymerization that a 1-molar benzene solution thereof has a viscosity of 55 centipoises at 20° C. The hydrolysis is carried out in the presence of sulfuric acid.

EXAMPLE I 120 parts of partially dried hydrolyzed polyvinyl acetate containing 66 parts of polyvinyl alcohol having 0.27 part acetate groups calculated as polyvinyl acetate, 1.65 parts of sulfuric acid and the remainder a mixture of ethanol and ethyl acetate is suspended in 400 parts of methanol and 210 parts of crotonaldehyde. The resulting mixture is heated at 55° C. with stirring for about 30 minutes. 400 parts of additional methanol is then added and the heating and stirring continued at 55° C. for 6 hours. Thereupon, the reaction is stopped by the addition of 5 parts of potassium acetate dissolved in 50 parts of methanol. A further addition of 200 parts of methanol is made and the resin is then precipitated by the addition of water with rapid stirring. The precipitated resin is thoroughly washed with water and stabilized by stirring for 2 hours a suspension thereof in an aqueous solution containing about 10% ethanol and sufficient sodium hydroxide to be N/200 with respect thereto. The resin is again washed and finally dried by suction.

A yield of 98.4 parts of a white, spongy resin is obtained which, on analysis, is found to contain 16.6% hydroxyl groups by weight calculated as polyvinyl alcohol. The product is found to be soluble in methanol, ethanol, acetic acid, dioxane, ethylene dichloride, pyridine and in the mixtures of ethanol and benzene containing up to 70% benzene. The product forms a cloudy suspension in acetone and ethyl acetate.

EXAMPLE II 100 parts of methanol-washed, partially dried, hydrolyzed polyvinyl acetate containing 75 parts of a polyvinyl alcohol having 0.3 part of combined acetate groups calculated as polyvinyl acetate, 0.16 part of sulfuric acid and the balance methanol, are mixed with 475 parts of methanol and 210 parts of crotonaldehyde and the mixture stirred at a temperature of 60° C. for about 30 minutes. An additional 400 parts of methanol is then added and the heating at 60° C. continued for 6 hours. Thereupon the reaction is stopped by the addition of 5 parts potassium acetate dissolved in 40 parts methanol. An additional 200 parts of methanol are added and then the resin is precipitated by the addition of water while stirring. The precipitated resin is thoroughly washed with cold water and slurried for several hours with N/200 sodium hydroxide solution, washed with water and finally dried by suction.

The product comprises white, porous granules and is found to contain, on analysis, 27.2% hydroxyl groups by weight calculated as polyvinyl alcohol. The resin is partially soluble in methanol, ethanol, acetic acid and pyridine.

EXAMPLE III 400 parts of partially dried hydrolyzed polyvinyl acetate containing 265 parts of polyvinyl alcohol containing 1.2 parts of combined acetate groups calculated as polyvinyl acetate, 6.5 parts sulfuric acid and the remainder a mixture of ethanol and ethyl acetate are mixed with 2670 parts of methanol. The mixture is heated to 58° C., whereupon 972 parts of crotonaldehyde are added and the mixture heated with stirring at about 60° C. for 2½ hours. The reaction product is ther neutralized by adding a solution of 15 parts potassium acetate in 100 parts methanol and the resin precipitated in the form of white, spongy granules by the addition of water with stirring. The product, after washing and drying, is found to contain 18.8% hydroxyl groups calculated as polyvinyl alcohol and to be soluble in methanol, ethanol, acetic acid and pyridine.

It is found that on molding this product under heat and pressure, a transparent, practically colorless molding is obtained.

100 parts of the product of this example are compounded on hot rolls with 30 parts dibutyl phthalate, 30 parts diethyl phthalate and 40 parts ethanol. The resulting plastic, on molding under heat and pressure, forms a transparent, substantially colorless, rubber-like sheet which is soluble in ethanol. When lower proportions of plasticizer are used, a somewhat stiffer product is obtained. In contrast to similarly plasticized polyvinyl butyral, the plasticized products of this invention are much less flexible and less tacky.

When Example III is repeated, except that anhydrous ethanol is substituted for methanol, an insoluble, semi-fusible product is obtained which is found to contain 25.1% hydroxyl groups by weight calculated as polyvinyl alcohol. Substituting dioxane for the methanol in Example III results in a product which is insoluble and only slightly fusible. This product is found to contain 20.6% hydroxyl groups by weight, calculated as polyvinyl alcohol. When glacial acetic acid is substituted for methanol in Example III, a stiff jelly forms in about 5 minutes and on prolonged heating becomes even more stiff.

EXAMPLE IV 43 parts of polyvinyl acetate are dissolved in 275 parts of methanol and after raising the temperature to 60° C. 5 parts of sulfuric acid (1.5% of the total mixture) diluted with 10 parts of methanol are added. The mixture is heated and stirred for 2½ hours at 60° C. At this point a definite cloudiness is noted in the reaction product and 55 parts of crotonaldehyde are added and the heating and stirring continued for another hour and a half. The mixture is then neutralized by the addition of 10 parts of potassium acetate dissolved in 40 parts of methanol. After cooling to room temperature, the resin is precipitated by the slow addition of water while agitating vigorously. The precipitated resin is washed with water and stabilized by slurrying with an N/200 potassium hydroxide solution, washed again with water and dried. The product is soluble in methanol, ethanol, acetic acid, ethyl acetate, acetone, ethylene dichloride, dioxane and pyridine. On analysis, it is found to contain 12.6% acetate groups by weight calculated as polyvinyl acetate and 20.1% hydroxyl groups by weight calculated as polyvinyl alcohol.

Variations in the compositions of polyvinyl acetal resins made according to the invention may be introduced by suitable variations in the reaction conditions. The examples below in Table A illustrate the results obtained by variations in the quantity of aldehyde used and in the duration of the hydrolysis and acetalization steps. Aside from the conditions set forth in Table A, the reaction conditions in Examples V–VIII are the same as those in Example IV.

In the table PVOAc stands for polyvinyl acetate and PVOH stands for polyvinyl alcohol.

Table A

| Example | H₂SO₄ | Hydrolysis Time | Crotonaldehyde | Acetalization time | Composition PVOAc | Composition PVOH |
|---|---|---|---|---|---|---|
| | Per cent | Minutes | Parts | Minutes | Per cent | Per cent |
| V | 1.7 | 100 | 75 | 240 | 9.9 | 10.4 |
| VI | 1.3 | 120 | 63 | 60(60° C.) / 960(25° C.) | 20.9 | 10.9 |
| VII | 1.3 | 90 | 75 | 120 | 42.1 | 11.1 |
| VIII | 1.5 | 130 | 60 | 120 | 10.9 | 16.8 |

The resins produced in the preceding examples, namely, Examples I–VIII are substantially polyvinyl acetals of crotonaldehyde, excepting for the polyvinyl acetate and polyvinyl alcohol group content indicated in each example.

One of the critical phases of the process of the invention in preparing soluble polyvinyl acetal resins by using crotonaldehyde is the provision of an excess of the unsaturated aldehyde over that required for complete reaction with the polyvinyl alcohol. Thus, it has been found that at least 3 molecular equivalents of unsaturated aldehyde should be initially present for every molecular equivalent of polyvinyl alcohol, i. e., each hydroxyl group in the polyvinyl alcohol. A much larger excess is permissible, as for example, up to 10 or more equivalents of aldehyde for each equivalent of polyvinyl alcohol. Usually 3–5 equivalents of aldehyde for each hydroxyl group in the polyvinyl alcohol are found to give satisfactory results.

The amount of solvent for the polyvinyl crotonaldehyde acetal resin which is present may be substantially varied and is governed largely by purposes of convenience and economy. The minimum quantity used is the amount which is necessary to render the reaction mixture sufficiently fluid for ready agitation. On the other hand, excessive amounts are avoided, partially for reasons of economy. Usually at least 600 parts by weight, but preferably not more than 2000 parts by weight of solvent are used for every 100 parts by weight of hydrolyzed polyvinyl ester. Of the solvent used, a sufficient proportion thereof to effect the purpose of the invention, i. e. production of a soluble, fusible polyvinyl crotonaldehyde acetal resin, must be methanol. Usually it is found that at least 75% by weight of the solvent must be methanol, i. e., up to 25% of the solvent may be a liquid which is miscible with the methanol solution of the polyvinyl crotonaldehyde acetal resin, e. g., ethanol, ethyl acetate, dioxane, benzene, acetic acid, acetone, etc.

The amount of sulfuric acid catalyst used in the acetalization reaction may be substantially varied. Generally, the presence of sufficient acid is desired to avoid an unduly long reaction. On the other hand, an excessive amount of acid renders difficult the stabilization of the product. Usually it is found that the presence of 0.001% to 2% H₂SO₄ based on the total charge represents a desirable amount of catalyst.

When sulfuric acid is used to catalyze the hydrolysis of the polyvinyl ester, a certain amount of sulfuric acid is usually occluded and/or combined in the hydrolysis product and may be used in catalyzing the subsequent acetal reaction. If too much acid is retained in the hydrolysis product, the excess may be removed by washing. If too little is retained, additional acid may be added to supplement the amount present.

As indicated by the examples, polyvinyl alcohols of substantial variation as regards ester group content may be used. A preferred group of polyvinyl alcohols are those in which the ester group content is such that the resulting acetal resin contains not over 30% ester groups by weight calculated as polyvinyl ester. However, polyvinyl alcohols having higher ester group contents than that given above may be used. Thus, the polyvinyl acetal resins of the invention may contain 1–99%, preferably 5–95%, crotonaldehyde acetal groups by weight calculated as polyvinyl crotonaldehyde acetal, the balance being hydroxyl, ester, other acetal groups and the like, by using a polyvinyl alcohol having sufficient hydroxyl groups so that the desired degree of acetalization with crotonaldehyde may be effected by reaction according to the invention.

According to one embodiment of the invention, the acetal resins of the invention contain 25–95% crotonaldehye acetal groups calculated as polyvinyl crotonaldehyde acetal. Such products are especially suitable for conversion into infusible, insoluble products by heating or other means as set forth hereinafter.

While the examples all illustrate the invention as applied to polyvinyl alcohols hydrolyzed in an acid medium, it should be understood that polyvinyl alcohols obtained by hydrolysis of polyvinyl esters in an alkaline medium may also be used. If there is any residual alkaline catalyst in the polyvinyl alcohol, suitable adjustment is made in the amount of sulfuric acid catalyst for the acetalization step.

In place of polyvinyl alcohols made from polyvinyl acetate, corresponding polyvinyl alcohols made from other polyvinyl esters such as the formate, propionate, butyrate, hexoate, benzoate, etc., may be used as is apparent to those skilled in the art.

The duration of the acetalization reaction is governed by such reaction conditions as the temperature employed, amount of catalyst, amount of methanol, etc. However, in order to obtain products soluble in organic solvents, it is usually necessary to continue the acetalization reaction until the hydroxyl group content of the product is reduced to 30% or less by weight, calculated as polyvinyl alcohol. A preferred group of acetal resins are those which contain 5–25% hydroxyl groups by weight, calculated as polyvinyl alcohol.

While there may be substantial variation in the temperature of the acetalization reaction, temperatures over 100° C. are not customary and preferably the temperature does not exceed about 75° C. Much lower temperatures may be used when desired, as for example, down to 20–25° C., but since the reaction is extremely slow at such low temperatures, it is usually not found to be advantageous to go below 40° C.

The products of the invention are found to have unexpected and advantageous characteristics in addition to those disclosed above. Thus, for example, the products of the invention may be copolymerized with compounds containing ethylenic unsaturation to form highly useful copolymers.

Examples of copolymerizable compounds include polymerizable compounds which contain a terminal ethylene group ($CH_2=C<$). Thus, various vinyl or vinylidene compounds may be used, as for example, vinyl esters of organic acids such as vinyl acetate, vinyl proprionate, vinyl butyrate; vinyl halides, such as vinyl chloride and vinyl bromide; vinylidene halides, such as vinylidene chloride, vinylidene bromide; vinyl or substituted vinyl group-containing acids and esters thereof such as acrylic acid, methacrylic acid, methyl acrylate, ethyl acrylate, methyl methacrylate and ethylene glycol di-methacrylate; acrylonitrile, methallyl chloride, etc. Mixtures of two or more of the above or other copolymerizable compounds may be used.

Other unsaturated compounds may be used in which the unsaturation is in a position other than the terminal position. Examples of such compounds are esters of unsaturated acids, e. g., alkyl esters of alpha-beta-unsaturated dicarboxylic acids, such as dimethyl, diethyl, dibutyl, dihexyl, and dioctyl maleate, fumarate, and the like.

It is usually desirable that at least 1–5% of the mixture to be copolymerized be a polyvinyl crotonaldehyde acetal of the invention. For some purposes, much larger amounts are advantageous, e. g., 50–95%. For other purposes, 10–25% represents a desirable proportion. Thus, as shown by Example VI, as little as 11% of the crotonaldehyde acetal of the invention is sufficient to produce an insoluble copolymer.

It is further discovered that the acetal resins of the invention may be rendered infusible and insoluble by heating in the presence or absence of such insolubilizing agents as organic peroxides, benzoyl peroxide, acetyl peroxide, etc., curing agents such as sulfur, selenium, and the like and compounds thereof with which may be included various rubber vulcanization accelerators.

EXAMPLE IX

A polyvinyl crotonaldehyde acetal resin made in accordance with the invention and containing about 17% hydroxyl groups by weight calculated as polyvinyl alcohol, about 1% acetate groups calculated as polyvinyl acetate and the balance substantially crotonaldehyde acetal is dissolved in ethanol to form a solution containing 7.5% by weight of the acetal resin. 80 cc. of this solution are mixed with 50 cc. of vinyl acetate and 2.5 grams of benzoyl peroxide. The resulting mixture, on heating for 30 minutes at 60° C. forms a stiff jelly which is insoluble in ethanol.

Similar results are obtained on substituting acrylonitrile, ethyl acrylate, methyl acrylate or methallyl chloride for the vinyl acetate in Example IX.

In contrast to the results obtained in Example IX, 80 cc. of a 7.5% ethanol solution of the same polyvinyl crotonaldehyde acetal resin as used in Example IX are mixed with 50 cc. of additional ethanol and 2.5 grams of benzoyl peroxide. On heating the resulting mixture for 30 minutes at 60° C., there is no indication of gelation.

In further contrast to the results obtained in Example IX, substitution of polyvinyl butyraldehyde acetal resin for the polyvinyl crotonaldehyde resin produces a product which, on heating for 30 minutes at 60° C. shows no indication of gelation.

EXAMPLE X 100 parts of polyvinyl crotonaldehyde acetal resin of the invention containing about 19% hydroxyl groups by weight calculated as polyvinyl alcohol, about 1% acetate groups calculated as polyvinyl acetate and the balance crotonaldehyde acetal, are mixed with 40 parts of dibutyl phthalate and 2 parts of precipitated sulfur. The resulting mixture is molded under pressure at 170°

C. for 15 minutes. The molded product is found to be insoluble in ethanol. In contrast to the above results, omission of the sulfur produces a material which, on molding under the same conditions, yields a product which is soluble in ethanol.

Products which are similar in their characteristics are also obtained when any of the following ingredients or mixtures of ingredients are included in the composition of Example X; 0.5 part of diphenyl guanidine, 0.5 part diphenyl guanidine and 0.5 part of litharge, 0.5 part mercaptobenzothiazole and 0.5 part zinc stearate, 0.5 part benzothiazyl 2-monocyclohexyl sulfonamide, 0.5 part tetramethyl thiuram disulfide, and 0.5 part zinc N,N-diethyl dithiocarbamate. The product in each case is similar to that when sulfur alone is used.

EXAMPLE XI

Example IX is repeated except that 2 parts of benzoyl peroxide is substituted for the sulfur. The resulting product is found to be transformed into a product insoluble in ethanol on molding at 170° C. for 15 minutes.

EXAMPLE XII

A polyvinyl crotonaldehyde acetal resin containing about 18% hydroxyl groups calculated as polyvinyl alcohol, less than 3% acetate groups calculated as polyvinyl acetate and the balance substantially crotonaldehyde acetal, is dissolved in ethanol and the resulting solution is used to form a film which, on heating for 1 hour at 105° C., becomes insoluble in ethanol.

Similar results are obtained when a plasticizer such as dibutyl phthalate is included in the ethanol solution.

It is found that insolubilization in heating solutions of the resins of the invention may be retarded by the inclusion of hydroquinone. For example, the addition of 5% by weight based on the acetal resin in the ethanol solution of Example XII, causes the product to remain soluble when heated for as much as 7 hours at 105° C. However, insolubility occurs on heating for 4 hours at 150° C.

The foregoing description is intended to illustrate the invention without limiting the scope thereof as set forth in the appended claims.

What is claimed is:

1. A process for producing an organic solvent soluble polyvinyl acetal resin from crotonaldehyde which comprises reacting a mixture of polyvinyl alcohol and at least three molecular equivalents of crotonaldehyde for each molecular equivalent of polyvinyl alcohol, in the presence of sulfuric acid and a solvent containing at least 75% methanol, said solvent being present in an amount of 600 to 2000 parts for every 100 parts of polyvinyl alcohol.

2. A process as defined in claim 1 in which the polyvinyl alcohol is hydrolyzed polyvinyl acetate.

3. A process as defined in claim 1 in which the polyvinyl alcohol is hydrolyzed polyvinyl acetate containing not over 30% acetate groups by weight calculated as polyvinyl acetate.

ANDREW F. FITZHUGH.

REFERENCES CITED

The following references are of record in the file of this patent:

UNITED STATES PATENTS

| Number | Name | Date |
|---|---|---|
| 1,955,068 | Hopff | Apr. 17, 1934 |
| 2,044,730 | Kuehn | June 16, 1936 |
| 2,157,384 | Davidson | May 9, 1939 |
| 2,194,613 | Perkins | Mar. 26, 1940 |
| 2,387,833 | Dahle | Oct. 30, 1945 |
| 2,467,430 | Izard | Apr. 19, 1949 |

FOREIGN PATENTS

| Number | Country | Date |
|---|---|---|
| 873,366 | France | Mar. 16, 1942 |
| 882,688 | France | Mar. 8, 1943 |